United States Patent
Tai et al.

(10) Patent No.: US 8,503,196 B2
(45) Date of Patent: Aug. 6, 2013

(54) FEEDBACK CIRCUIT AND CONTROL METHOD FOR AN ISOLATED POWER CONVERTER

(75) Inventors: Liang-Pin Tai, Gueiren Township, Tainan County (TW); Tzu-Chen Lin, Taipei (TW); Cheng-Hsuan Fan, Hukou Shiang (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 274 days.

(21) Appl. No.: 12/838,988

(22) Filed: Jul. 19, 2010

(65) Prior Publication Data

US 2011/0018590 A1    Jan. 27, 2011

(30) Foreign Application Priority Data

Jul. 21, 2009 (TW) .............................. 98124622 A

(51) Int. Cl.
*H02M 3/335* (2006.01)
*H02M 1/36* (2007.01)

(52) U.S. Cl.
USPC ........ 363/21.15; 363/21.12; 363/49; 323/901

(58) Field of Classification Search
USPC .............. 363/21.04, 21.07, 21.12, 21.15, 49, 363/97; 323/901
See application file for complete search history.

(56) References Cited

U.S. PATENT DOCUMENTS

| | | | | |
|---|---|---|---|---|
| 5,157,269 | A * | 10/1992 | Jordan et al. | 307/59 |
| 6,125,046 | A * | 9/2000 | Jang et al. | 363/21.15 |
| 6,580,313 | B1 * | 6/2003 | Womac | 327/551 |
| 6,795,321 | B2 * | 9/2004 | Balakrishnan et al. | 363/21.15 |
| 8,125,800 | B2 * | 2/2012 | Forghani-zadeh et al. | 363/21.15 |
| 2006/0114699 | A1 * | 6/2006 | Suekuni | 363/21.07 |
| 2008/0266907 | A1 * | 10/2008 | Kim et al. | 363/21.1 |
| 2009/0201701 | A1 * | 8/2009 | Cuadra et al. | 363/21.15 |
| 2010/0283409 | A1 * | 11/2010 | Yinn et al. | 315/297 |

* cited by examiner

*Primary Examiner* — Adolf Berhane
*Assistant Examiner* — Fred E Finch, III
(74) *Attorney, Agent, or Firm* — Muncy, Geissler, Olds & Lowe, PLLC

(57) ABSTRACT

A feedback circuit for an isolated power converter includes an opto-coupler and a reversed polarity regulator. The opto-coupler provides a current related to an output voltage of the isolated power converter. When the isolated power converter enters light load, the output voltage rises and the reversed polarity regulator reduces the current to decrease the power consumption and thus improve the light load efficiency of the isolated power converter.

7 Claims, 3 Drawing Sheets

US 8,503,196 B2

FEEDBACK CIRCUIT AND CONTROL METHOD FOR AN ISOLATED POWER CONVERTER

FIELD OF THE INVENTION

The present invention is related generally to an isolated power converter and, more particularly, to a feedback circuit and control method for an isolated power converter.

BACKGROUND OF THE INVENTION

As shown in FIG. 1, a conventional isolated power converter 10 includes a rectifier circuit 12 to convert an alternating-current (AC) voltage VAC to a direct-current (DC) voltage Vin applied to a primary coil Lp of a transformer T1 via a snubber 16, a power switch 18 serially connected to the primary coil Lp, and a controller 14 to generate a control signal Vgate according to a feedback signal Vcomp and a sense signal Vcs proportional to the current Ip flowing through the primary coil Lp, to switch the power switch 18 to convert the voltage Vin to an output voltage Vout. The controller 14 has a power input pin VDD to receive a supply voltage Vcc. A feedback circuit 20 detects the output voltage Vout to generate the feedback signal Vcomp for the controller 14. The feedback circuit 20 includes an opto-coupler 22 and a Zener diode 28 functioning as a shunt regulator. The opto-coupler 22 generates a current Icomp according to the output voltage Vout to determine the feedback signal Vcomp. The opto-coupler 22 includes a light-emitting diode (LED) 24 as an input device and a transistor 26 as an output device. A current Id proportional to the output voltage Vout flows to the ground via the LED 24 and the Zener diode 28. The opto-coupler 22 amplifies the current Id flowing through the LED 24 to generate the current Icomp flowing through the transistor 26. The Zener diode 28 is connected to the LED 24 to limit the maximum voltage at the cathode of the LED 24.

When the loading of the power converter 10 becomes lighter, the output voltage Vout increases and thereby causes an increase in the current Id flowing through the LED 24. As a result, the current Icomp flowing through the transistor 26 increases accordingly. The increased current Icomp pulls the feedback signal Vcomp lower and thereby shortens the on time of the power switch 18. However, the increase in the currents Id and Icomp also implies higher power consumption, which lowers the efficiency of the power converter 10 at light loading.

Therefore, it is desired an apparatus and method for improving the light load efficiency of an isolated power converter.

SUMMARY OF THE INVENTION

An object of the present invention is to provide a feedback circuit and control method for improving the light load efficiency of an isolated power converter.

According to the present invention, a feedback circuit for an isolated power converter using a controller to switch a power switch to convert an input voltage to an output voltage, includes an opto-coupler coupled to an output of the isolated power converter to amplify a first current related to the output voltage to generate a second current, a current-to-voltage converter connected to the opto-coupler to generate a first voltage according to the second current, a reversed polarity regulator connected to the opto-coupler to decrease the first current in response to an increase in the output voltage during a light load period, a voltage source to provide a second voltage, and a start up circuit coupled to the current-to-voltage converter and the voltage source to select one of the first voltage and the second voltage as a feedback signal for the controller.

According to the present invention, a control method for an isolated power converter using a controller to switch a power switch to convert an input voltage to an output voltage, includes amplifying a first current related to the output voltage to generate a second current by an opto-coupler, decreasing the first current in response to an increase in the output voltage during a light load period, generating a first voltage according to the second current, and selecting one of the first voltage and a preset second voltage as a feedback signal for the controller.

Due to the first and second currents in the opto-coupler decreasing in response to an increase in the output voltage during the light load period, the light load efficiency of the isolated power converter is improved.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
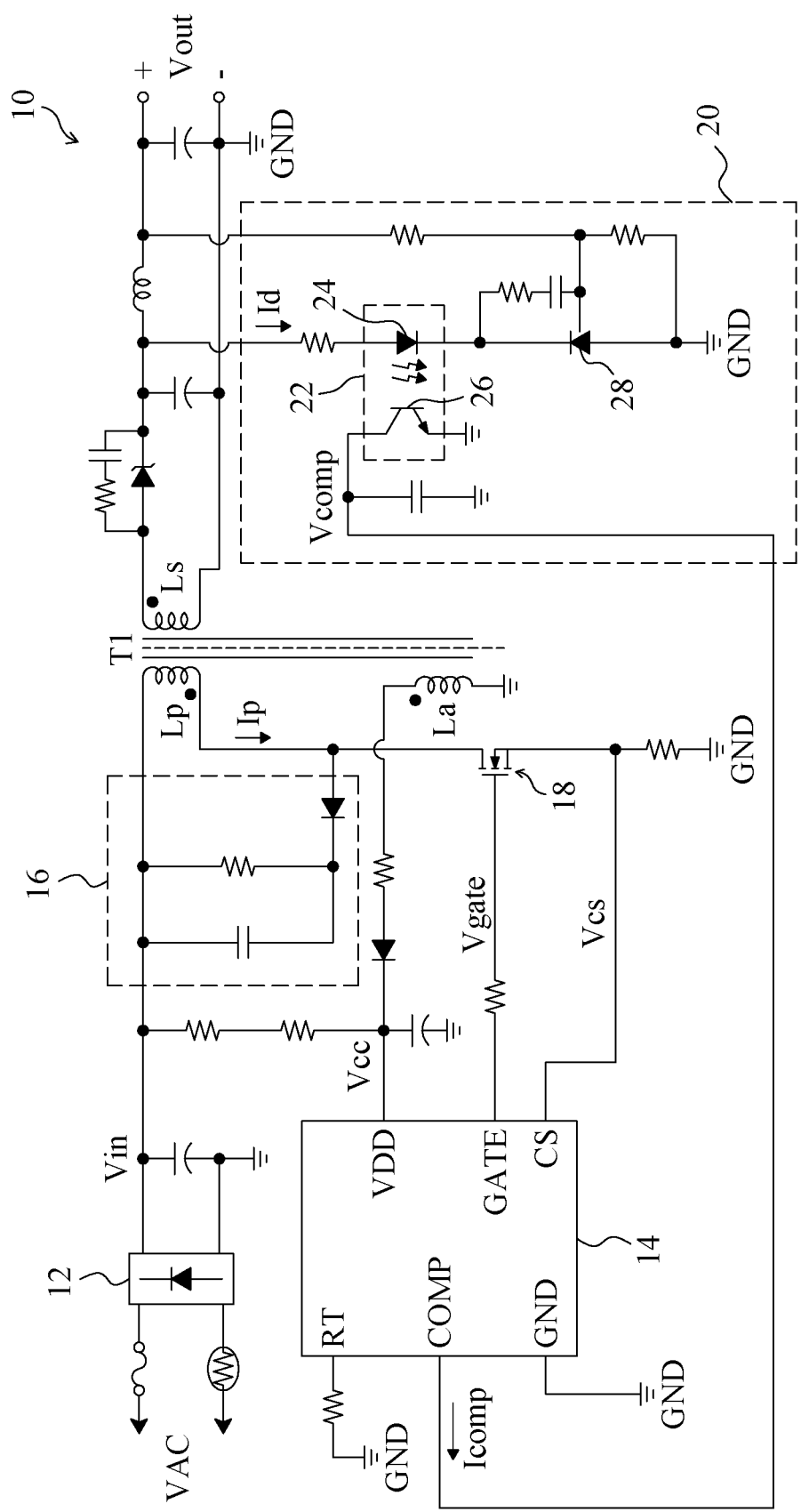
FIG. 1 is a circuit diagram of a conventional isolated power converter.
Figure 2:
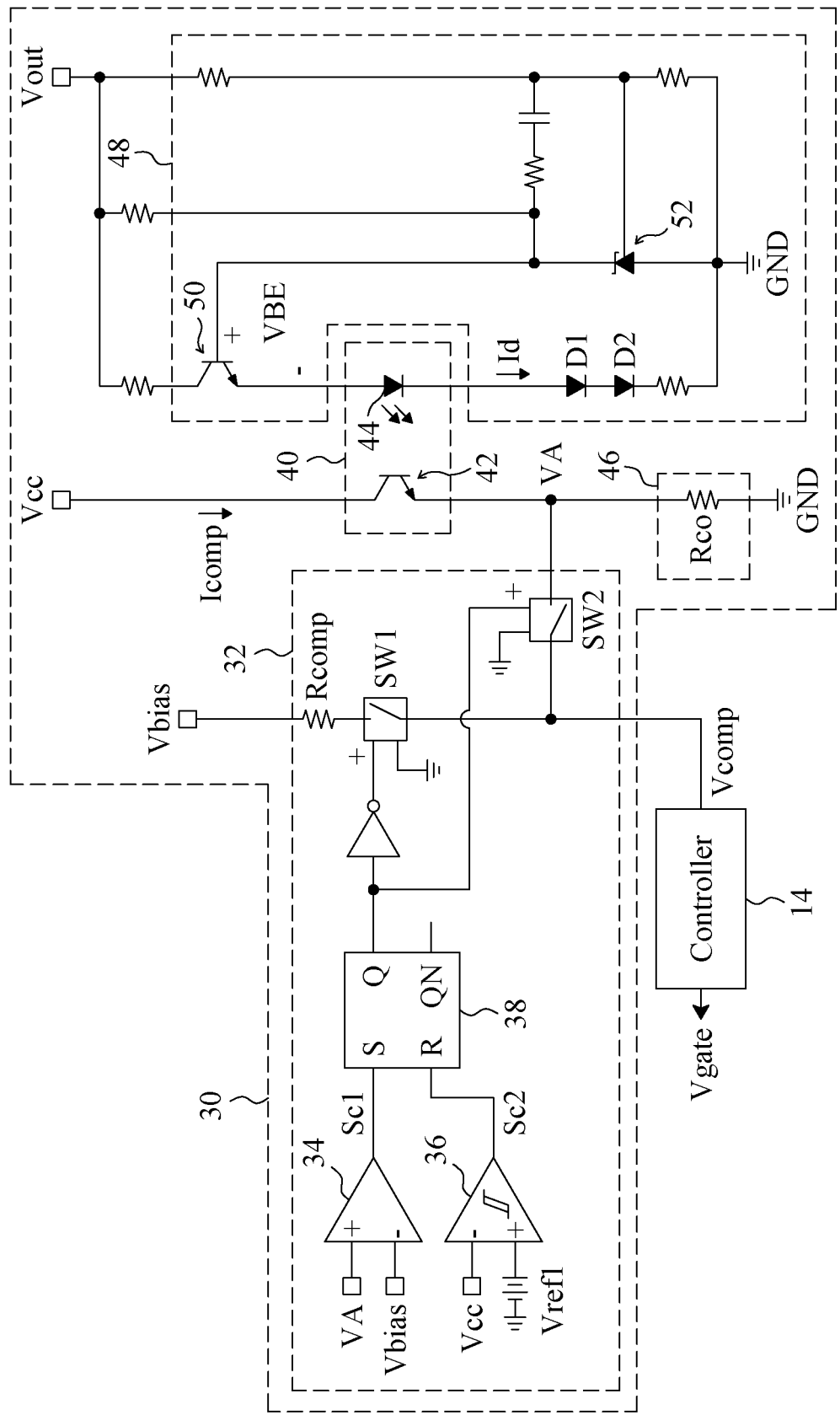
FIG. 2 is a circuit diagram of a feedback circuit according to the present invention.

FIG. 2 is a circuit diagram of a feedback circuit 30 according to the present invention. Referring to FIG. 2 in conjunction with FIG. 1, in the feedback circuit 30, an opto-coupler 40 includes a transistor 42 as an output device of the opto-coupler 40 connected between the power input pin Vcc and a current-to-voltage converter 46, and an LED 44 coupled to the output of the isolated power converter 10, the current Id flowing through the LED 44 and related to the output voltage Vout is amplified by the opto-coupler 40 to produce a current Icomp flowing through the transistor 42, a reversed polarity regulator 48 is connected to the opto-coupler 40 to control the current Id such that the current Id decreases or increases in response to an increase or decrease in the output voltage Vout, respectively, the current-to-voltage converter 46 includes a resistor Rco to generate a voltage VA according to the current Icomp provided by the opto-coupler 40, and a start up circuit 32 operates to ensure start of the isolated power converter 10. More specifically, while the isolated power converter 10 is being started, the start up circuit 32 selects a voltage Vbias as the feedback signal Vcomp for the controller 14; after the isolated power converter 10 is started, the start up circuit 32 selects the voltage VA as the feedback signal Vcomp for the controller 14.

In the start up circuit 32, a switch SW1 is connected between the voltage source Vbias and the controller 14, a switch SW2 is connected between the current-to-voltage converter 46 and the controller 14, a comparator 34 receives and compares the voltages Vbias and VA to generate a comparison signal Sc1, a hysteresis comparator 36 receives and compares the supply voltage Vcc and a reference voltage Vref1 to generate a comparison signal Sc2, and a flip-flop 38 has a set terminal S and a reset terminal R to receive the comparison signals Sc1 and Sc2, respectively, to switch the switches SW1 and SW2 according to the comparison signals Sc1 and Sc2. When the isolated power converter 10 is started, both the voltages VA and Vcc are zero and consequently, the comparison signal Sc1 is low and the comparison signal Sc2 is high. Hence, the output signal Q of the flip-flop 38 is low and thus turns on the switch SW1 and turns off the switch SW2. At this time, the voltage Vbias is selected as the feedback signal Vcomp for the controller 14, causing the output voltage Vout, the voltage VA, and the supply voltage Vcc all to increase. When the voltage VA becomes higher than the voltage Vbias, the comparison signal Sc1 transits to high, and thus the output signal Q of the flip-flop 38 is set high, thereby turning off the switch SW1 and turning on the switch SW2. At this time, the voltage VA is selected as the feedback signal Vcomp for the controller 14.

In the reversed polarity regulator 48, a bipolar junction transistor (BJT) 50 has its collector and emitter coupled to the output of the isolated power converter 10 and the LED 44, respectively, and a Zener diode 52 is connected between the base of the BJT 50 and ground GND to limit the maximum voltage at the base of the BJT 50. When the load of the isolated power converter 10 becomes lighter, the output voltage Vout increases, so the voltages at the collector and the emitter of the BJT 50 increase accordingly. Furthermore, due to the voltage at the base of the BJT 50 limited by the Zener diode 52, the voltage VBE between the base and the emitter of the BJT 50 decreases in response to the increase in the output voltage Vout. According to the current formula of the BJT 50, the BJT 50 conducts the current $$Id = Is \times e^{(VBE/VT)},  \quad [\text{Eq-1}]$$

where Is is a scale current and VT is the thermal voltage. From the equation Eq-1, the current Id decreases with a decrease in the voltage VBE. In other words, at light load, the current Id decreases in response to the increase in the output voltage Vout, and hence the current Icomp decreases as well. Accordingly, the voltage VA as the feedback signal Vcomp also decreases and thereby shortens the on time of the power switch 18.

Figure 3:
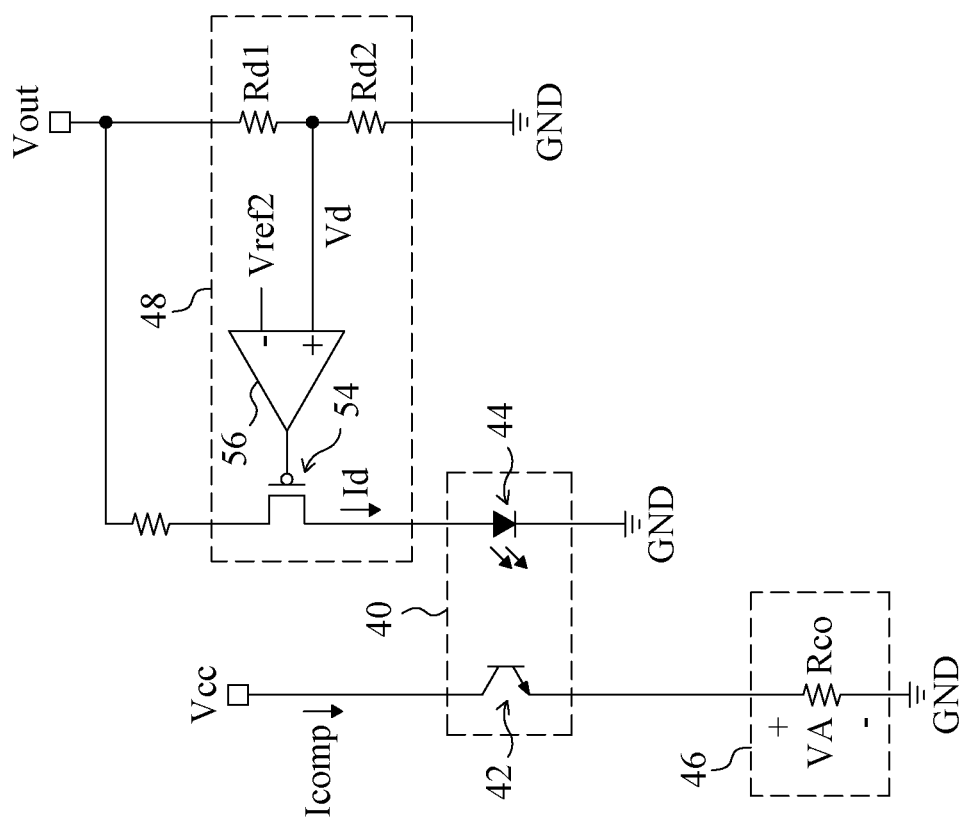
FIG. 3 is a circuit diagram of another embodiment for the reversed polarity regulator shown in FIG. 2.

FIG. 3 is a circuit diagram of another embodiment for the reversed polarity regulator 48 shown in FIG. 2, which includes a PMOS transistor 54, an operational amplifier 56, and resistors Rd1 and Rd2. Referring to FIG. 3 in conjunction with FIG. 1, the PMOS transistor 54 is connected between the output of the isolated power converter 10 and the LED 44 of the opto-coupler 40, the resistors Rd1 and Rd2 divide the output voltage Vout to generate a voltage Vd, and the operational amplifier 56 controls the channel thickness of the PMOS transistor 54 according to a reference voltage Vref2 and the voltage Vd. When the load of the isolated power converter 10 becomes lighter, the voltage Vd increases with the output voltage Vout. Accordingly, the operational amplifier 56 provides a higher voltage to the gate of the PMOS transistor 54 and thereby reduces the channel thickness of the PMOS transistor 54. As a result, the currents Id and Icomp are decreased.

When the isolated power converter 10 employing the feedback circuit 30 of the present invention operates at light load, the currents Id and Icomp in the opto-coupler 40 decrease in response to an increase in the output voltage Vout, thus improving the light load efficiency of the isolated power converter 10.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A feedback circuit for an isolated power converter including a controller to switch a power switch to convert an input voltage to an output voltage, the feedback circuit comprising:
   an opto-coupler coupled to an output of the isolated power converter, operative to amplify a first current related to the output voltage to generate a second current;
   a current-to-voltage converter connected to the opto-coupler, operative to generate a first voltage according to the second current;
   a reversed polarity regulator connected to the opto-coupler, operative to decrease the first current in response to an increase in the output voltage at light load;
   a voltage source providing a second voltage; and
   a start up circuit coupled to the current-to-voltage converter and the voltage source, operative to select one of the first voltage and the second voltage as a feedback signal for the controller;
   wherein the start up circuit comprises:
   a first switch connected between the current-to-voltage converter and the controller;
   second switch connected between the voltage source and the controller;
   a first comparator connected to the current-to-voltage converter and the voltage source to compare the first voltage with the second voltage to generate a first comparison signal;
   a second comparator configured to compare a supply voltage to the isolated power converter with a reference voltage to generate a second comparison signal; and
   a flip-flop connected to the first comparator and the second comparator to switch the first switch and the second switch according to the first comparison signal and the second comparison signal.

2. The feedback circuit of claim 1, wherein the current-to-voltage converter comprises a resistor to generate the first voltage according to the second current.

3. The feedback circuit of claim 1, wherein the reversed polarity regulator comprises:
   a BJT having a collector coupled to the output of the isolated power converter, an emitter coupled to an input of the opto-coupler, and a base coupled to the output of the isolated power converter; and
   a Zener diode connected between the base and the emitter of the BJT to limit a maximum voltage at the base of the BJT.

4. The feedback circuit of claim 1, wherein the reversed polarity regulator comprises:
   a PMOS transistor connected between the output of the isolated power converter and an input of the opto-coupler; and
   an operational amplifier connected to a gate of the PMOS transistor to reduce a channel thickness of the PMOS transistor when the output voltage increases.

5. A control method for an isolated power converter including a controller to switch a power switch to convert an input voltage to an output voltage, the control method comprising the steps of:
   (A) amplifying a first current elated to the output voltage to generate a second current by an opto-coupler;
   (B) decreasing the first current in response to an increase in the output voltage at light load;

(C) generating a first voltage according to the second current;
(D) providing a second voltage; and
(E) selecting one of the first voltage and the second voltage as a feedback signal for the controller;
wherein the step E comprises the steps of:
comparing the first voltage with the second voltage to generate a first comparison signal;
comparing a supply voltage to the isolated power converter with a reference voltage to generate a second comparison signal; and
selecting one of the first voltage and the second voltage as the feedback signal according to the first comparison signal and the second comparison signal.

6. The control method of claim 5, wherein the step (B) comprises the steps of:
controlling a magnitude of the first current with a BJT; and
limiting a maximum voltage at a base of the BJT so that the first current decreases in response to the increase in the output voltage at light load.

7. The control method of claim 5, wherein the step (B) comprises the steps of:
controlling a magnitude of the first current with a PMOS transistor; and
reducing a channel thickness of the PMOS transistor in response to the increase in the output voltage at light load.

* * * * *